United States Patent
Aslam et al.

(10) Patent No.: US 9,024,271 B2
(45) Date of Patent: May 5, 2015

(54) WEARABLE RADIATION DETECTOR

(76) Inventors: Shahid Aslam, Washington, DC (US); Karin Edgett, Washington, DC (US)

( * ) Notice: Subject to any disclaimer, the term of this patent is extended or adjusted under 35 U.S.C. 154(b) by 211 days.

(21) Appl. No.: 13/529,529

(22) Filed: Jun. 21, 2012

(65) Prior Publication Data

US 2012/0326046 A1 Dec. 27, 2012

Related U.S. Application Data

(60) Provisional application No. 61/500,972, filed on Jun. 24, 2011.

(51) Int. Cl.
*G01J 1/42* (2006.01)
*G01J 1/02* (2006.01)

(52) U.S. Cl.
CPC ............ *G01J 1/0233* (2013.01); *G01J 1/0204* (2013.01); *G01J 1/0247* (2013.01); *G01J 1/429* (2013.01); *G01J 2001/0261* (2013.01)

(58) Field of Classification Search
CPC ..... G01J 1/0204; G01J 1/0233; G01J 1/0247; G01J 1/429; G01J 2001/0261
USPC ....................... 250/372, 214 DC, 214.1, 484.5
See application file for complete search history.

(56) References Cited

U.S. PATENT DOCUMENTS

| | | | | |
|---|---|---|---|---|
| 4,608,655 | A | * | 8/1986 | Wolf et al. ................... 702/176 |
| 5,008,548 | A | * | 4/1991 | Gat ............................. 250/372 |
| 5,151,600 | A | * | 9/1992 | Black .......................... 250/372 |
| 5,500,532 | A | * | 3/1996 | Kozicki ....................... 250/372 |
| 2008/0258155 | A1 | * | 10/2008 | Chiba .......................... 257/80 |
| 2009/0218504 | A1 | * | 9/2009 | Pelizzo et al. ............... 250/372 |
| 2009/0224881 | A1 | * | 9/2009 | Koon et al. .................. 340/7.48 |
| 2010/0096559 | A1 | * | 4/2010 | Yao et al. ..................... 250/372 |
| 2011/0168919 | A1 | * | 7/2011 | Yoder et al. ................ 250/483.1 |

FOREIGN PATENT DOCUMENTS

DE 4329665 C1 * 5/1994
EP 2 568 266 A1 3/2013

OTHER PUBLICATIONS

J.L. Weyher, Characterization of wide-band-gap semiconductors (GaN, SiC) by defect-selective etching and complementary methods, Received May 9, 2006; accepted Jun. 19, 2006, Elsevier Ltd., Superlattices and Microstructures 40 (2006) 279-288.*
Amini, Navid, et al.; A Wireless Embedded Device for Personalized Ultraviolet Monitoring; Computer Science Department, University of California, Los Angeles, CA.
Fahrni, Thomas, et al.; Sundroid: Solar Radiation Awareness with Smartphones; Computer Engineering and Networks Laboratory; ETH Zurich, Switzerland.
Matthews, Jerrid, et al.; Ultraviolet Guardian—Real Time Ultraviolet Monitoring; Computer Science Department, University of California, Los Angeles, CA.

* cited by examiner

*Primary Examiner* — Mark R Gaworecki

(57) ABSTRACT

Provided herein are a wearable radiation detector and a method of controlling thereof, the detector including: the radiation collection unit operable to collect light and output a signal corresponding to the light collected; a memory; a display unit; a processor operable to receive the signal output by the radiation collection unit, to store a value in the memory corresponding to the signal output by the radiation collection unit, to output an output signal based at least on the signal corresponding to the light collected by the radiation collection unit and to control the display unit to display an indication corresponding to the output signal, wherein the determining includes continually calculating the maximum exposure level based on the light being received by the radiation collection unit.

15 Claims, 14 Drawing Sheets

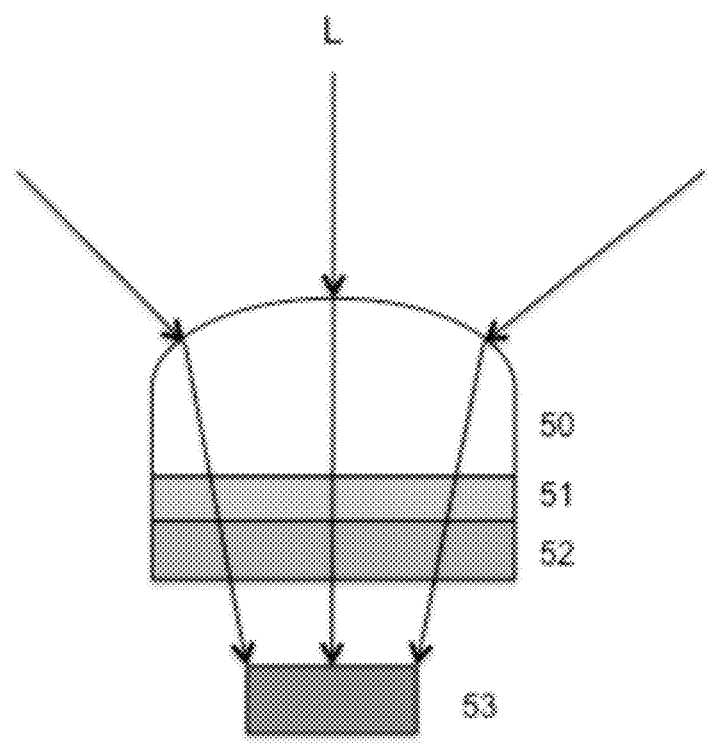

WEARABLE RADIATION DETECTOR

CROSS-REFERENCE TO RELATED APPLICATIONS

This application claims priority from U.S. Provisional Application No. 61/500,972 filed on Jun. 24, 2011 in the U.S. Patent and Trademark Office, the disclosure of which is incorporated herein by reference in its entirety.

BACKGROUND

1. Field

Apparatuses and methods consistent with the present inventive concept relate to a device and method for monitoring radiation exposure, and more particularly, a wearable radiation detection device, and method of controlling the same, for monitoring a wearer's exposure to ultraviolet A (UVA) and ultraviolet B (UVB) radiation.

The ultraviolet (UV) region covers the spectral wavelength range 100-400 nm and is divided into three bands: UVA (315-400 nm) UVB (280-315 nm) and UVC (100-280 nm). As sunlight passes through the atmosphere, UVC radiation and approximately 90% of UVB radiation are absorbed by ozone, water vapor, oxygen and carbon dioxide. By contrast, UVA radiation is less affected by the atmosphere, and is able to penetrate the atmosphere to a larger extent. As a result, the UV radiation reaching the Earth's surface is largely composed of UVA radiation with a small component UVB radiation.

Unfortunately, the majority of people are unaware that years of exposure to the sun are cumulative, and ultimately damage the skin. The UV rays of the sun cause degenerative changes in the dermis that result in premature aging from the loss of the elasticity, this leads to thinning, wrinkling, and drying of the skin. Prolonged and repeated sun exposure has been shown to be a major factor in pre-cancerous and cancerous lesions. Studies have shown that UVB radiation may be a key factor in the development of skin cancer—whereas ultraviolet UVA radiation augments the carcinogenic effects of UVB.

The skin is the largest organ of the body and its primary function is to protect the underlying tissue by acting as a surface barrier to the external environment. The epidermis, or the outer layer of the skin, contains melanocytes that produce melanin, a pigment that protects the body from injurious ultraviolet rays. A fair-skinned person, one who has smaller amounts of melanin, should be especially cautious about excessive sun exposure. Even on overcast days, since up to 80% of the UV rays penetrate through the clouds, serious sunburns can occur. Some sunscreens may filter some UVA and most UVB rays, but a sunscreen that blocks all UVA is presently not available.

Moreover, certain topical and systemic medications enhance the sun's effect, even with brief exposure. The chemicals in these medications absorb light and release energy that harms cells and tissue. This is known as drug-induced photosensitivity and the result is unwanted sunburns. Drugs that may cause photosensitivity are: (i) Antidysrythmics, e.g., Amiodorone, Quinidine Antihistamines, Diphenhydramine (Benedryl), Anti-infectives, Sulfonamides, Tetracyclines, Chloroquine, Griseofulvin, Nalidixic Acid, Antineoplastics-Chemotherapy Medications, Dacarbazine, Methotrexate, Fluorouracil (5FU); (ii) Diuretics, e.g., Thiazides, Chlorothiazides and (iii) Psychotherapeutics, e.g. Chlorpromazine, Chlorothiazides, Promazine, Thioridazine, Sulfonylureas.

Other issues of concern regarding UV exposure include the potential for intraocular damage, e.g., increased risk of cataracts. Consequently, protective eyewear and limited exposure are recommended.

Additionally, some individuals are particularly sensitive to UV radiation exposure. For example, post-cosmetic surgery patients must closely monitor their exposure time to UVA rays, and particularly, with chemical facelift and chemical-peel procedures. In this case, because of the reduction of melanin due to the cosmetic procedure, a patient might well be advised to avoid sunlight up to six months in order to prevent hyperpigmentation.

The Food and Drug Administration (FDA) has rated popular sunscreen products according to their sun protection factor (SPF). This is a method of measuring the effectiveness of sunscreen filtering and absorption of UVB radiation. Previously; there was no similar rating of products to screen UVA radiation. New FDA regulations require new labels on sunscreens that do not protect from UVA radiation to be labeled "Skin Cancer/Skin Aging Alert: Spending time in the sun increases your risk of skin cancer and early skin aging. This product has only been shown to prevent sunburn, not skin cancer or early skin aging." If the sunscreen blocks both UVA radiation, it will include ingredients such as titanium dioxide, inc oxide, avobenzone and mexoryl SX and be labeled as "Broad Spectrum." Beginning in 2013, the FDA will recognize the words "Broad Spectrum" on sunscreens packaging, as "Broad Spectrum" indicates a wide range of absorbance, including both UVA and UVB wavelengths. Nevertheless, the best ways to avoid overexposure of UV rays is to cover and protect skin and eyes, as well as limit the time spent exposed to UV rays as much as possible.

Other not-so-well-known maladies or conditions exasperated by over-exposure of UVA and UVB are briefly enumerated here: (i) contact dermatitis, e.g., poison ivy, poison oak, allergic rash, photo dermatitis and discoid lupus erythematosus; (ii) prior heat exhaustion/stroke. If a patient has had a previous diagnosis of heat exhaustion, afterward they are more susceptible to heat stroke than before. People who work in the sun, e.g., postal carriers and construction workers, would benefit by being able to monitor how much exposure they receive in order to prevent the development of heat stroke; (iii) rosacea; (iv) radiation patients; and (v) head/neck cancer.

Furthermore, other conditions that are sensitive to over exposure of UVA and UVB include (i) chemotherapy drugs, (ii) some antibiotics such as doxycycline and tricyclic anti-depressants; (iii) increased risk for macular damage that could lead to macular degeneration; (iv) increased risk for development of cataracts; and (v) increased risk for melanoma.

In patients that suffer from seasonal affect disorder, some sun exposure is helpful for them, but if there were other diagnosis present that requires limited exposure, it would be beneficial to monitor how much exposure they are actually receiving.

Erythema, or skin redness caused by inflammation, is the most widely used clinical endpoint in human skin photobiology. Erythema is also used in determining the sun protection factor (SPF) of sunscreens. Despite its widespread use, little is known of the basic biology of ultraviolet radiation (UVR)-induced erythema.

Individual sensitivity to UVR is assessed by the minimal erythema dose (MED), most often 24 hours after irradiation. The MED is defined as the lowest UVR dose that will cause either a just perceptible redness or redness with a definite border. One study has shown that the former definition is more reliable.

Several workers have determined action spectra (i.e., relative effectiveness at different wavelengths) for the MED in human skin using "monochromatic" radiation, in reality narrow-to-broad-spectrum radiation, from a monochromator. Some earlier studies have been pooled to generate a reference erythema action spectrum that has been adopted by the Commission Internationale de l'Eclairage (CIE). These studies show that UVB (280-315 nm) is orders of magnitude more effective per unit dose ($J/m^2$) than UVA (315-400 nm). For example, the median MED at 300 nm is 0.025 $J/cm^2$, whereas exposure at 360 nm is 32 $J/cm^2$. A comparison of the action spectra for erythema and epidermal DNA photodamage provides strong circumstantial evidence that DNA is a major chromophore for erythema. Studies indicate that the most destructive, wavelengths for most biological organisms are between 305 nm and 310 nm.

The global solar UV Index (UVI) describes the level of solar UV radiation at the Earth's surface. The values of the index range from zero upward—the higher the index value, the greater the potential for damage to the skin and eye, and the less time it takes for harm to occur.

The global solar UVI is a simple measure of the UV radiation level at the Earth's surface and an indicator of the potential for skin damage. It serves as an important vehicle to raise public awareness and to alert people about the need to adopt protective measures when being exposed to UV radiation. The UVI was developed through an international effort by the World Health Organization (WHO) in collaboration with the United Nations Environment Program (UNEP), the World Meteorological Organization (WMO) and the International Commission on Non-Ionizing Radiation Protection (IC-NIRP).

UV radiation levels, and therefore the values of the index, vary throughout the day. In reporting the UVI, most emphasis is placed on the maximum UV radiation level in a given day. This occurs during the four-hour period around solar noon. Depending on geographical location and whether daylight saving time is applied, solar noon takes place between local noon and approximately 2:00 p.m. News/weather media usually present a forecast of the maximum UVI radiation level for the following day.

According to the Skin Cancer Foundation about 90% of non-melanoma and about 65% melanoma skin cancers are associated with ultraviolet (UV) radiation from the sun. About 700,000 new cases are diagnosed each year, and the numbers are rising despite the increased use of sunscreen. Additionally, according to the Skin Cancer Foundation, vitamin D is essential for bone health, immune system functioning, and a lack of it puts us at risk for painful weak muscles, inadequate bone mineralization and skeletal deformities in children as well as mineral loss and soft bones in adults. Our bodies manufacture vitamin D when the sun's UVB rays interact with 7-dehydrocholesterol present in the skin [ . . . ] a few minutes at midday are sufficient for many Caucasians [ . . . ] after reaching the production limit, further exposure actually destroys the vitamin, decreasing vitamin D levels. The Mayo Clinic also states that vitamin D, which comes mainly from sun exposure, is responsible for many health-promoting properties such as cancer prevention, inflammation reduction, etc. Therefore, there is a need to balance the benefits versus the risks of exposure, and optimal limits on exposure are desirable.

2. Description of Related Art

Various patents are known which disclose disposable dosimeters designed to warn about the amount of sun radiation absorbed, and thus to inform an individual when she should terminate exposure to sun radiation. However, such related art systems are lacking in both durability and versatility due to their overly simplistic design.

In view of this, it can be seen that there is a need for a UVA and UVB radiation monitoring aid that can be used on a daily basis in order to provide the user with reliable information about the permissible duration of exposure to sun radiation irrespective of the user's skin type, season, and other atmospheric conditions, i.e., allow for personal customization. Further, it is desirable to provide a reliable system which is capable of being worn for extended periods by many different types of individuals under a variety of environmental conditions.

SUMMARY

Exemplary embodiments overcome the above disadvantages and other disadvantages not described above. Also, an exemplary embodiment is not required to overcome the disadvantages described above, and may not overcome any of the problems described above.

According to an exemplary embodiment there is provided a wearable radiation detector comprising a radiation collection unit operable to collect light and output a signal corresponding to the light collected; a memory; a display unit; a processor operable to receive the signal output by the radiation collection unit, to store a value in the memory corresponding to the signal output by the radiation collection unit, to output an output signal based at least on the signal corresponding to the light collected by the radiation collection unit and to control the display unit to display an indication corresponding to the output signal, wherein the determining includes continually calculating the maximum exposure level based on the light being received by the radiation collection unit.

The wearable radiation detector may further comprising a user input unit operable to output a user input signal corresponding to an input by a user, wherein the processor is further operable to select an output mode based on the user input signal received from the user input unit and the output signal output by the processor is further based on the selected output mode.

The display unit may include a light emitting diode (LED) and the indication is an output light emitted by the LED.

The light collected by the radiation collection unit may be continually collected over a period of time, and value corresponding to the light collected are continually stored in the memory.

The radiation collection unit may include a lens.

The radiation collection unit may include a plurality of radiation detectors, including a first detector operable to detect ultraviolet A radiation and a second detector operable to detect ultraviolet B radiation.

The wearable radiation detector may further include a wristband, wherein the radiation collection unit, the memory, the display unit and the processor are embedded in the wristband.

The radiation collection unit may include a wide band gap semiconductor. The wide band gap semiconductor maybe formed of at least one of GaN and SiC.

The radiation collection unit may include a window which allows light to pass through to the wide band gap semiconductor.

The radiation collection unit may further include a lens which focuses the light.

The radiation collection unit may further include thin-film filter which filters the light.

According to an exemplary embodiment there is provided a method of controlling a wearable radiation detector, the method comprising: receiving light via a radiation collection unit; outputting a signal corresponding the light received by the radiation collection unit; storing in a memory a value corresponding to the outputted signal; determining by a processor a real time dose and a maximum exposure time based on the value stored in memory, wherein the determining includes continually calculating the maximum exposure level based on the light being received by the radiation collection unit; and displaying by a display unit an indication corresponding to at least one of the real time dose and the maximum exposure time.

The method may further include receiving an input selection by a user; and selecting an operating mode based on the input selection, wherein the maximum exposure time is further based on the selected operating mode.

An exemplary embodiment of the present inventive concept provides the consumer with a wearable product for personal monitoring aid for the collection and quantification of UVA (320 nm to 400 nm spectral wavelength) and UVB (290 nm to 320 nm spectral wavelength) radiation from the sun.

An exemplary embodiment obtains a real-time UVA and UVB dosage reading that is dependent on frequent timed intervals of UVI readings in order to provide a variable and accurate total accumulation over a 24-hour period of time.

BRIEF DESCRIPTION OF THE DRAWINGS

In the following detailed description, a reference is made to the accompanying drawings that form a part hereof, and in which is shown by way of illustration specific embodiments that may be practiced.

FIGS. 5A and 5B show cross-sectional views of the wristband according to an exemplary embodiment;

DETAILED DESCRIPTION OF EXEMPLARY EMBODIMENTS

These embodiments are described in sufficient detail to enable those skilled in the art to practice the embodiments, and it is to be understood that other embodiments may be utilized and that logical, mechanical, electrical, electronic, and other changes may be made without departure from the scope of the embodiments. The following detailed description is, therefore, not to be taken in a limited sense.

Figure 1:
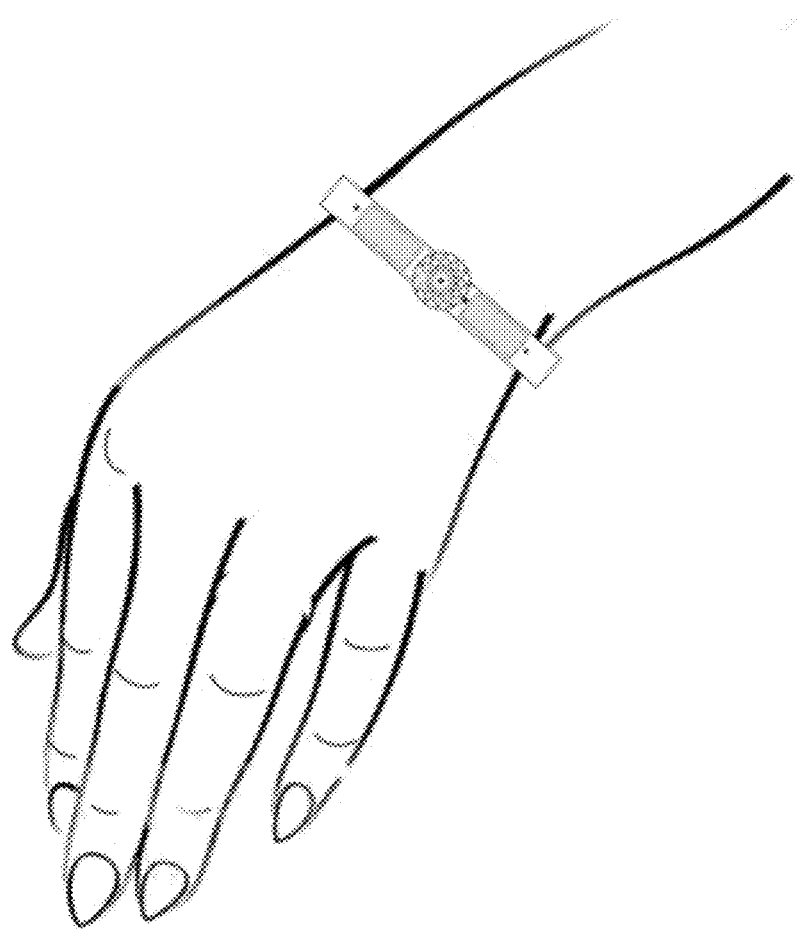
FIG. 1 shows an example of a wearable wristband according to an exemplary embodiment.

An exemplary embodiment of the present invention concept provides a wearable consumer product, such as a wristband (1) made out of silicone or other waterproof material. The manner in which wristband 1 may be worn is shown in FIG. 1. It should be noted that the present inventive concept is not limited to the exemplary embodiment shown in FIG. 1 and could be embodied in the form of other wearable garment(s) (e.g., such as a hat, a shirt, a watch, shoes, a button, a pin, a pendant, sandals, or any other type of clothing or wearable garment (e.g., purse, backpack, etc.).

Figure 2:
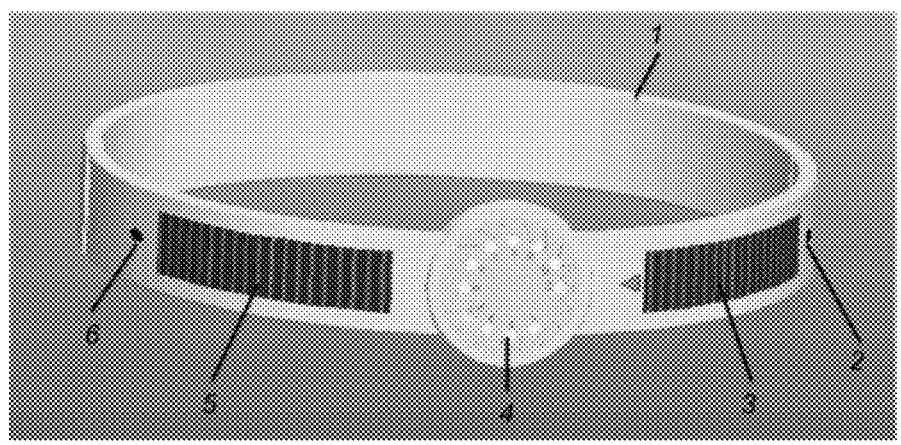
FIG. 2 shows the isometric view of front of a wristband according to an exemplary embodiment.

FIG. 2 is the isometric view of the front of a wristband according to an exemplary embodiment. The wristband (1) may be constructed from silicone or other material that is compatible with manufacturing processes for encapsulation of electronics. The wristband (1) may include wide band gap detectors (2) and (6) solar cells (3) and (5) for providing power and LED(s) (4) for the display.

Figure 3:
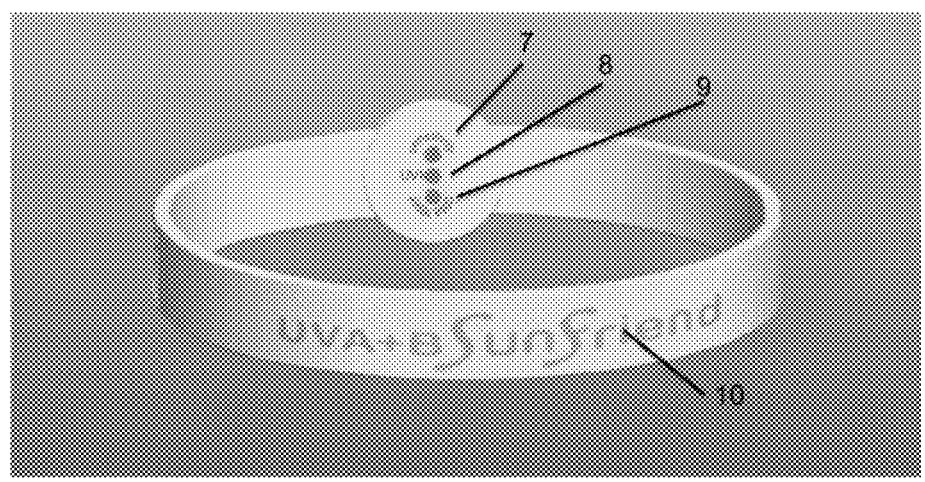
FIG. 3 shows the isometric view of a back of a wristband according to an exemplary embodiment.

FIG. 3 is an isometric view of the back of the wristband (1) and shows user input buttons, i.e., selection buttons for user functionality, specifically a skin sensitivity (SS) button (7), UVI button (8) and a 24 hr reset/OFF button (9). It should be noted that additional buttons may be added to support additional functionality. For example, if the wristband included an integrated clock, an additional button (or buttons) could be added to support the additional clock function(s). Another example might include an alarm function which causes an audible alert or a vibration if a predetermined exposure level has been exceeded.

Figure 4:
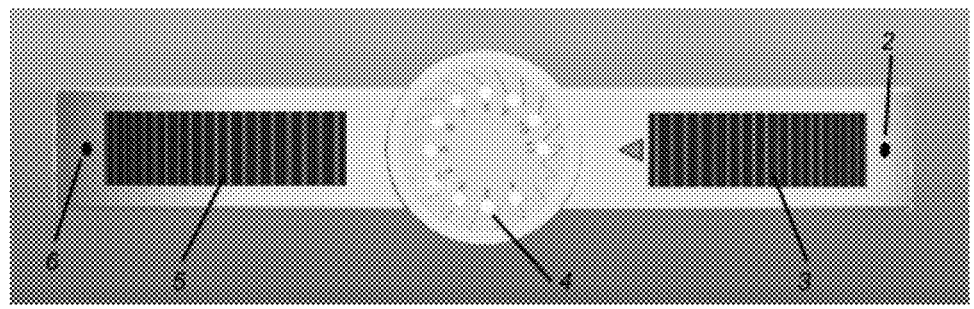
FIG. 4 shows a top view of wristband according to an exemplary embodiment.

FIG. 4 shows the top view of the wristband according to an exemplary embodiment, and shows that a display unit may be composed of any number of light emitting diodes, LED(s) (4) arranged in a circular manner in order to minimize footprint. The LED(s) (4) not only display the real time UVA+B dose in an adaptive way but may also serve as indications for SS setting and UVI indication when the appropriate selection buttons are depressed. Of course, the LED(s) may be arranged in patterns other than a circular one. For example, the LED(s) might be arranged in a line, a semi-circle, a rectangle, a diamond, etc.

It should be noted that exemplary embodiments could employ displays/indicators other than LED(s). For example, a liquid crystal display (LCD) or an e-ink display might be used to display the adaptive real time UVA+B dose and/or indications for skin sensitivity (SS) and UVI when the appropriate selection buttons are depressed.

Further, the display unit could be used to display values in addition to/other than the adaptive real time UVA+B dose, indications for SS and UVI when the appropriate selection buttons are depressed, etc. For example, maximum, minimum, average exposure values, etc., could be calculated and displayed.

Additionally, the values could be displayed in different colors and/or formats to provide additional information to the wearer. For example, LED(s) of various colors (e.g., green, yellow and red) could be used to indicate various states of exposure (or other such information).

Figure 5A:
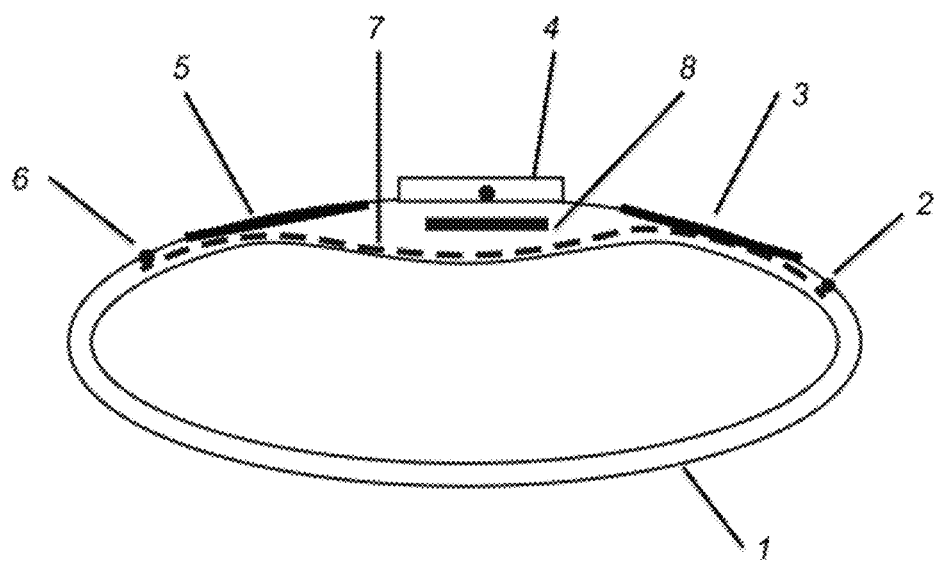

FIG. 5A shows the cross section of the wristband and highlights a flexible circuit board (7) and a backup battery (8) for powering the electronics and display when the solar cells are not giving out sufficient power. However, the circuitry could be powered entirely by a battery or, alternatively, entirely by solar power, or a combination of solar and battery power.

The wristband according to an exemplary embodiment collects light from the sun and quantifies UVA radiation (e.g., in the 320 nm to 400 nm spectral wavelength) and UVB radiation (e.g., in 290 nm to 320 nm spectral wavelength). As shown in FIG. 2, et seq., elements (2) and (6) represent the light collection points of the wristband. As noted above, elements (2) and (6) may be implemented via wide band gap detectors using SiC and GaN-based materials, for example.

Further, it should be noted that a lens could be employed in front of the respective wide band gap detectors (2) and (6) in order to increase the light collection field-of-view. For example, FIG. 5B shows one arrangement of how the light is collected and sensed. The light, L, is collected by a lens (50) that has a wide field-of-view and is transmissive to the light being collected, the light transmits through a window (51) and filter (52) that ensures that no out-of band light irradiates the detector (53). The lens (50) numerical aperture is matched to the detector area size for optimal performance.

Figure 11:
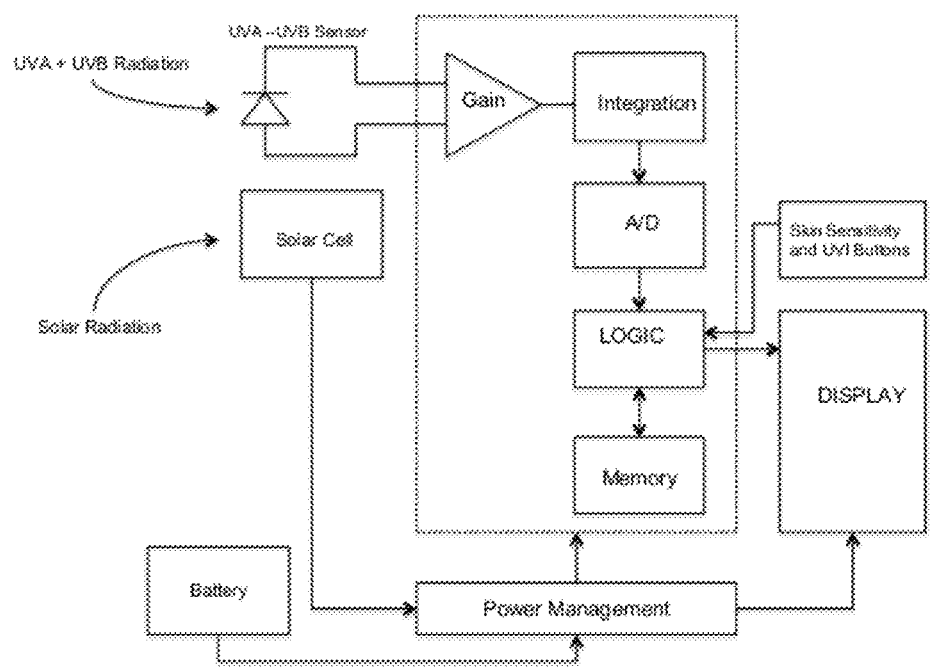
FIG. 11 shows an schematic of the electronic circuitry according to an exemplary embodiment.

Additionally, the wideband gap detectors (2) and (6) output a signal corresponding to the light collected, and the output signal could then be amplified and digitized to facilitate further processing. FIG. 11 (discussed further hereinbelow) shows an example of a circuit schematic which includes the light collection components as well as amplification and digitization components.

Figure 6:
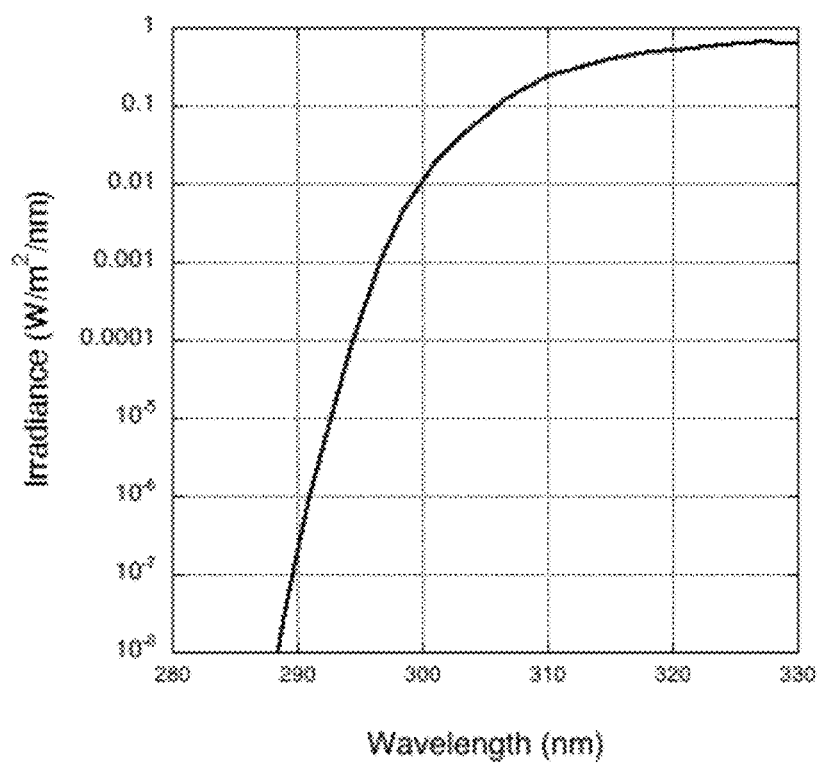
FIG. 6 shows an example of irradiance of the UV solar radiation versus wavelength according to an exemplary embodiment.

The total amount of UVA and UVB radiation that is potentially dangerous to an individual exposed to the sun may be determined on the basis of the effect of the sun's angle and ozone column. A typical irradiance from the sun at noon in La Paz, Mexico, for example, is shown in FIG. 6 for the wavelength range 280 nm to 330 nm. FIG. 6 shows a plot for 0° sun angle and a column ozone amount of 400 Dobson Units (DU). In this example, it can be seen that the irradiance at 290 nm is only one-one hundred millionths of that at 320 nm.

Figure 7:
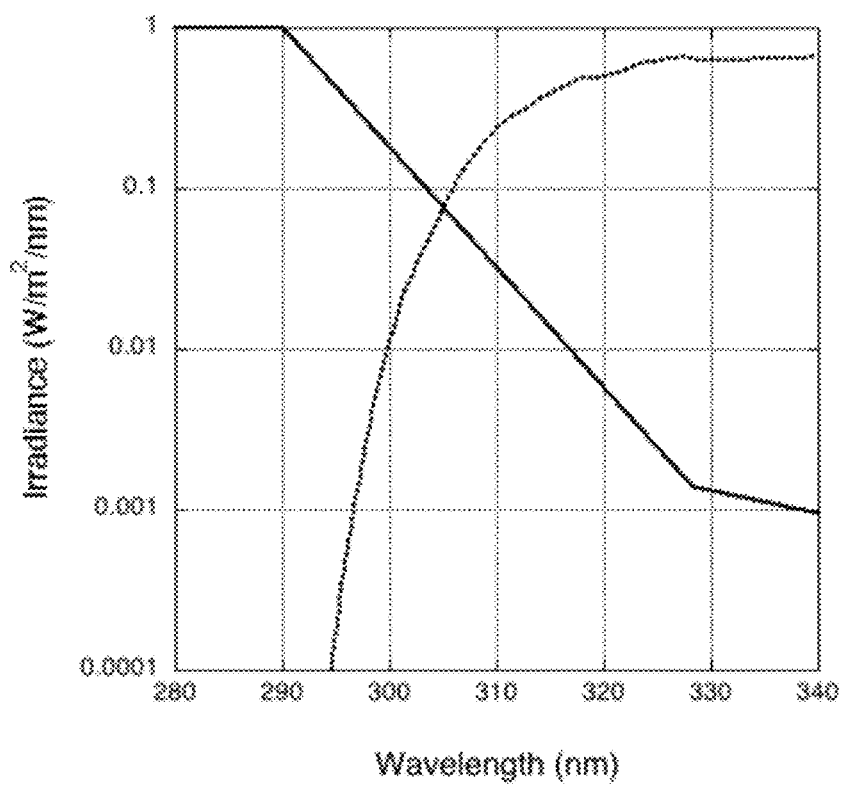
FIG. 7 shows an example of irradiance and Diffey action spectra according to an exemplary embodiment.

FIG. 7 shows the irradiance (400 DU and 0° sun angle) and the Diffey action spectra that gives the action or damage spectra for sunburn and represents the relative response of human skin to UVB as a function of wavelength. It should be noted that as the wavelength is decreased, the damage due to exposure increases logarithmically, and the sensitivity of skin at 290 nm is a thousand times than at 340 nm. At the same time, the sun's irradiance (i.e., the number of photons received from the sun) is decreasing logarithmically as a result of ozone absorption.

Figure 8:
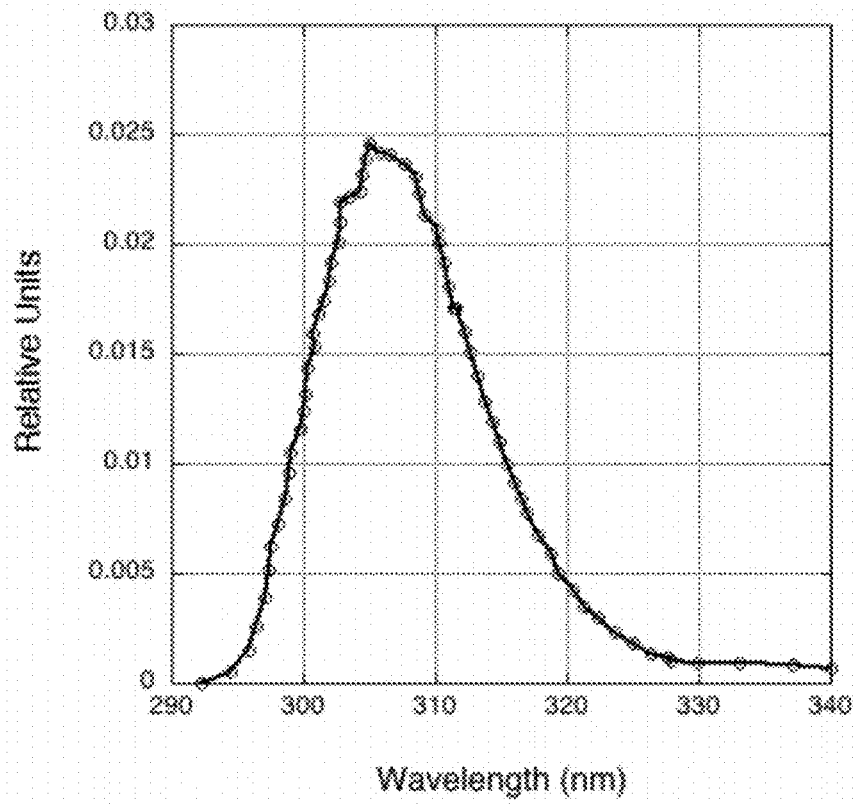
FIG. 8 shows an example of the Diffey weighted irradiance according to an exemplary embodiment.

FIG. 8 shows the multiplication of the two functions depicted in FIG. 7, i.e. the values in the irradiance curve and those in the Diffey curve. This weighting shows that the most destructive wavelengths are around 305 nm. Therefore, under these conditions, it is desirable to monitor the sun's irradiance in the most destructive wavelengths between 305 nm and 310 nm.

Figure 9:
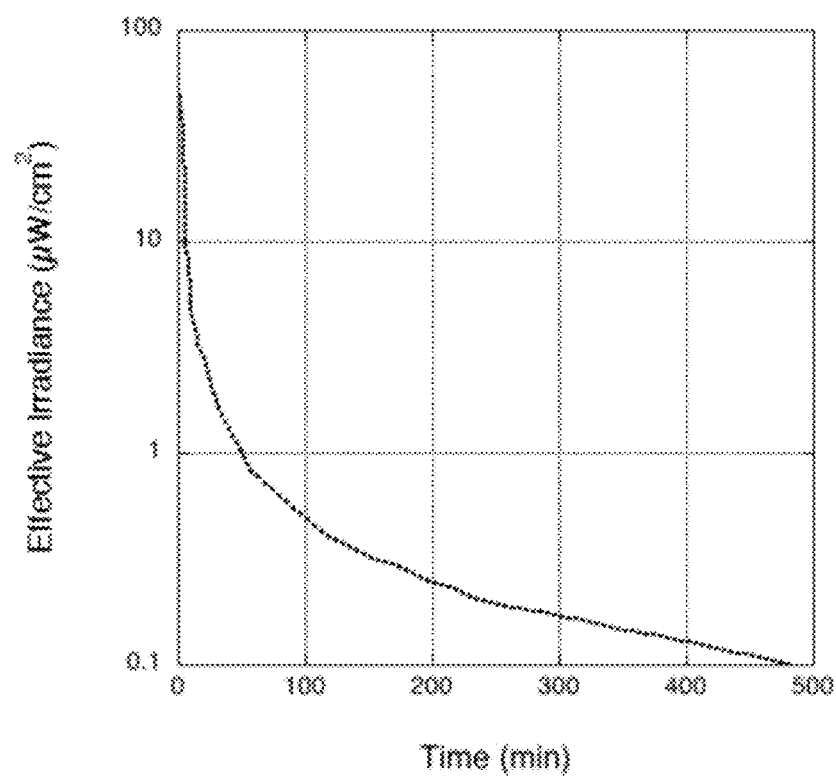
FIG. 9 shows an example of effective irradiance as a function of time for a sensitive skin type according to an exemplary embodiment.

FIG. 9 shows the maximal exposure duration for effective irradiance, i.e., normalized to a monochromatic source at 270 nm, for the most sensitive, non-pathological, skin phototypes (also known as melano-comprimised). The ultraviolet radiant exposure in the spectral region 280 to 365 nm upon unprotected skin should not exceed 30 $J/m^2$.

Figure 10:
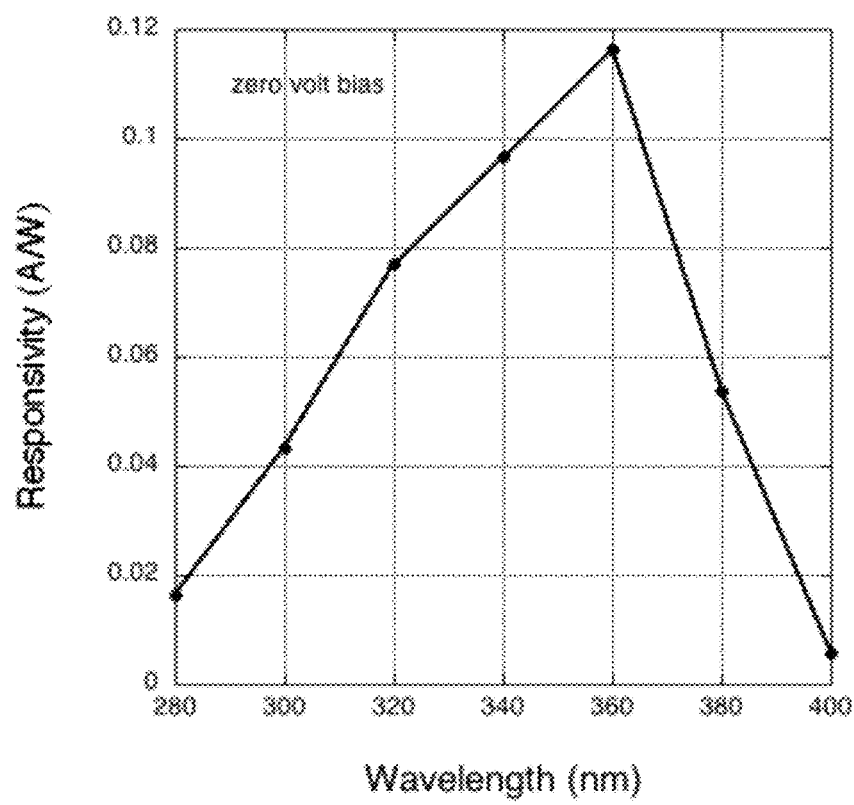
FIG. 10 shows an example of detector response to UV radiation according to an exemplary embodiment.

The effective intensity of irradiation at particular wavelength or range to which the UV detector is sensitive is determined from the dependence of UV radiation responsivity versus wavelength. An example of this relationship is shown in FIG. 10 for a wide band gap detector used in this invention.

As shown in FIG. 11, UVA and UVB radiation may be collected and sensed by any number of wide band gap detectors, such as GaN. The photocurrent received from the UV detector may be amplified and digitized. The digitized signal may then be processed by a microprocessor. A schematic of an exemplary embodiment is shown in FIG. 11. It should be noted that while FIG. 11 only one wide band gap photodiode, more than one photodiode may be used in parallel, and the received input could be processed using multi-channel processing components.

The detector, when integrated with the electronics has the ability to determine, the total irradiance from the UVA and UVB spectral bandwidth of the solar spectrum.

The detector and electronics are configured to measure the accumulated, real time dose in an adaptive way. A flow diagram of the operation of the wristband monitoring aid is shown in FIG. 12.

Figure 12:
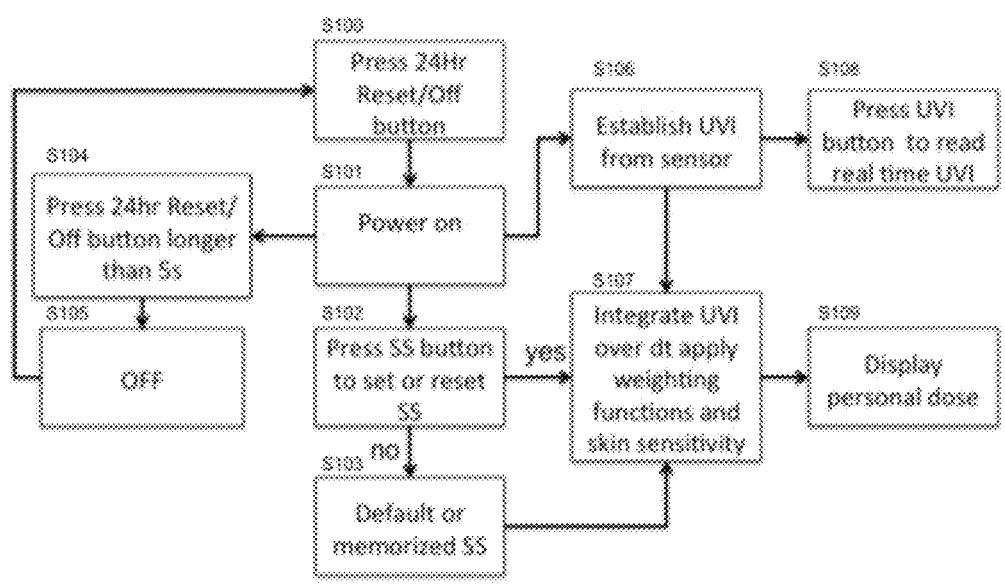
FIG. 12 shows operational logic according to an exemplary embodiment.

One example of a device with three button functions is shown in FIG. 12. As shown in FIG. 12, a 24 hr Reset/OFF button (S100) powers on the electronics (S101). Once powered up, the processor may interrogate the detector signal from which one can establish the real time UVI value (S106). The processor uses the UVI to calculate the real time dose using the SS value entered using the SS button (S102) together with predetermined weighting functions that are encode in the microprocessor. If the SS button (S102) is not set or reset, a default SS value (S103), which is stored in memory, may be used for the calculation. Once the dose value is calculated (S107) it is displayed (S109). At any time the user can press the UVI button and read the real time UVI (S108). If at any time the 24 hr Reset/OFF button is pressed longer than 5 s (S104) then the electronics may be powered down and the radiation collection unit is off (S105).

As noted above, the user can use a button, for example, a 24 hour reset/OFF button, to power up the device immediately and at regular intervals the UVI may be established from the light collector unit, and if subsequently the SS button is pressed, then together with this, the real time exposure level may have been established in an adaptive way from an algorithm operating in the microprocessor. Moreover, at any time while light is being collected and processing is going on, a UVI button can be pressed to read a real time reading of the UVI. At regular intervals the UVI may be interrogated and used in a microprocessor algorithm to give a real time exposure level which is continually updating and adjusting itself in an adaptive way. If the SS button was not pressed or set then a default value is used in the microprocessor algorithms. FIG. 3 shows an example of a SS button (7) that might be configured in this way.

Figure 13:
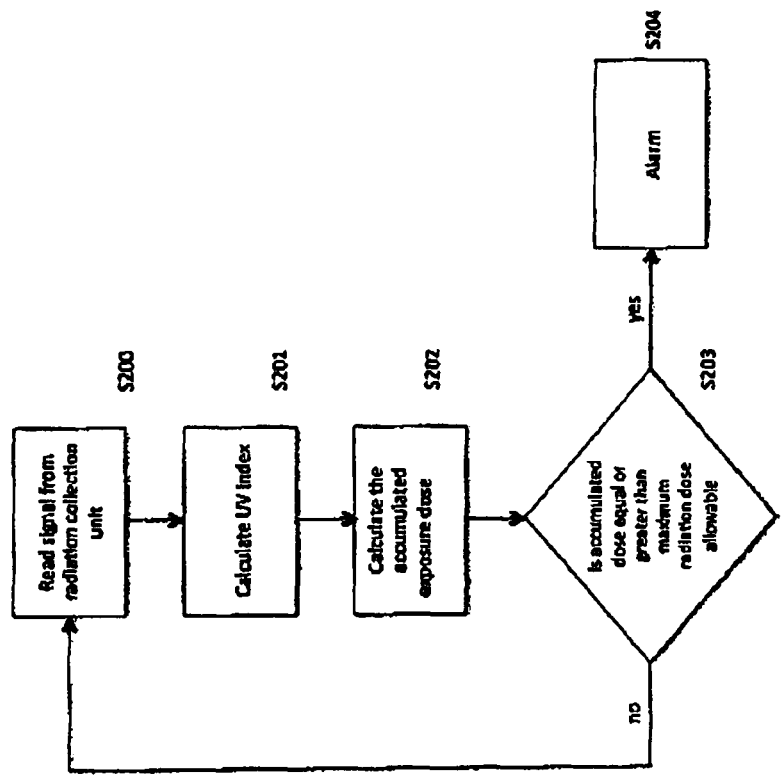

FIG. 13 shows an example of how the light radiation may be continually being monitored, at predetermined regular intervals by the microprocessor (S200). Algorithms in the microprocessor calculate the LTV index (S201) based on the signal from the radiation collection unit. The microprocessor may then calculate the accumulated exposure dose (S202) based on predetermined weighting functions and user set SS values as described in FIG. 12. The logic in the microprocessor may be configured to then decide whether the maximum allowable radiation exposure dose has been reached (S203) and if so an alarm will be displayed; if the maximum dose has not been reached then the microprocessor will interrogate the radiation collection unit again; this will continue until the maximum allowable dose has been reached.

The radiation collection unit together with the microprocessor and memory are capable of accumulating a real time dose, and the processor may be configured to calculate the maximum exposure time in an adaptive way. That is, the UV index may be continually, or at a set periodicity, calculated using the signal from the radiation collection unit, such that the accumulated dose is recalculated and adjusted incrementally. The accumulated dose value may thus be put into a feedback loop that recalculates and adjusts the estimated time to reach an overexposure value. The maximum exposure time may in turn be continually updated based on the light being received. It should be noted that the updating might be performed continually or at discrete intervals.

When the UVI selection button is depressed it may be made to an LED indication in an incremental position that conforms to a predetermined categorization of exposure levels, e.g., such as defined by the Global UV Index Warning System. For example the LED might display a single bar to indicate a level 1 exposure. Other display schemes may of course be employed.

The wristband incorporates both a battery and a solar cell for powering the electronics and the warning LED(s). Note that the energy source in the invention is not limited to solar and battery power, it could be some other small fuel source. Further, the solar cell might be replaced by another type of solar collection device, e.g., solar flake(s) or used in conjunction with other energy collection/storage components.

The energy source is not limited to solar, but could also be powered by a battery, or some other small fuel source. Further, the solar flake might be replaced by another type of solar collection device, or used in conjunction with other energy collection/storage components (e.g., voltage regulator, batteries, etc.).

The warning system could include a liquid crystal display (LCD) display, E-ink paper, light emitting diode (LED) light, a sound alarm or any other output capable of providing a user with an indication related to the UV radiation detected by the detector. Additionally, the warning system is not limited to only providing information related to "warnings." Instead, the warning system can be more generally thought of as an indicator, which is capable of providing useful information to the user based on the UV radiation detected by the detector.

Furthermore the wristband or wearable item may include a select button (such as shown in FIG. 3), for skin sensitivity (SS). The SS input is not limited to a button, but could be some other kind of input system, as long as the personalized input is available to the wearer. A UV Index (UVI) button may be configured so as to cause the display (e.g., the LED(s) to display the real time UVI reading. A reset button may also be included so that SS can be changed as needed along with the total UVA+B radiation.

The device might further include other types of buttons allowing input of other information or control commands which may be relevant to providing a more useful result to the user. For example, additional buttons might be provided for programming the microprocessor to perform various functions (e.g., download data, upload data, etc.). Moreover, multiple buttons might be consolidated into a single button or embodied as a touch panel display screen, or any other capable of receiving input from a user.

Although not shown, future versions of this wrist band or other wearable product could include a miniature communications device, such as USB, Bluetooth, WiFi, etc., for downloading raw data from the microprocessor to a computer for software manipulation, or uploading data to the device, so that the user can then keep a record of UVA+B exposure over the long term, and update/re-program the wearable device. Similarly, data could be downloaded to the device to update the software on the device, for example.

Furthermore, while some of the exemplary embodiments discussed herein are directed at detecting UVA and UVB, the present invention is not limited thereto. Instead, the UV detector might detect other forms of UV radiation such as UVR, etc.

Additionally, the processor might be configured so as to implement predetermined algorithms for performing additional processing functions, such as calculation of the exposure level, UV index, etc.

It will be further understood that aspects of the exemplary embodiments described above may be implemented as either hardware or software or some combination thereof. Further, aspects of the exemplary embodiments described above may be implemented as software, which may in turn be realized by executable instructions stored on computer-readable media, which may include transmission-type media, and which may be executed in a computer and/or by a processor.

A number of embodiments have been described hereinabove, however, other variants and modifications may be made without departing from the scope of the claims appended hereto.

The invention claimed is:

1. A wearable radiation detector comprising:
   a radiation collection unit operable to collect light;
   a memory;
   a display unit operable to display an indicator;
   a user input unit operable to output a user input signal corresponding to an input by a user;
   an Ultraviolet Index (UVI) button operable to be activated by a user;
   and
   a processor operable to:
   determine an instantaneous UVI value corresponding to the light collected by the radiation collection unit;
   store the UVI value in the memory;
   control the display unit to display the indicator based on the determined instantaneous UVI value if the UVI button is activated by the user;
   select an output mode based on the user input signal received from the user input unit; and
   output an output signal, wherein the output signal output by the processor is based on the selected output mode.

2. The wearable radiation detector of claim 1, wherein the display unit includes a light emitting diode.

3. The wearable radiation detector of claim 1, wherein the light collected by the radiation collection unit is continually collected over a period of time, and values corresponding to the light continually collected over the period of time are continually stored in the memory.

4. The wearable radiation detector of claim 1, wherein the radiation collection unit includes a lens.

5. The wearable radiation detector of claim 1, wherein the radiation collection unit comprises a plurality of radiation detectors, including a first detector operable to detect ultraviolet A radiation and a second detector operable to detect ultraviolet B radiation.

6. The wearable radiation detector of claim 1, further comprising a wristband, wherein the radiation collection unit, the memory, the display unit and the processor are embedded in the wristband.

7. The wearable radiation detector of claim 1, wherein the radiation collection unit comprises a wide band gap semiconductor.

8. The wearable radiation detector of claim 7, wherein the wide band gap semiconductor is formed of at least one of GaN and SiC.

9. The wearable radiation detector of claim 8, wherein the radiation collection unit further comprises a lens which focuses the light.

10. The wearable radiation detector of claim 8, wherein the radiation collection unit further comprises thin-film filter which filters the light.

11. The wearable radiation detector of claim 7, wherein the radiation collection unit comprises a window which allows the light to pass through to the wide band gap semiconductor.

12. The wearable radiation detector of claim 1, wherein the user input unit comprises a touch screen.

13. The wearable radiation, detector of claim 1, wherein the UVI button is activated by the user via a touch screen.

14. A method of controlling a wearable radiation detector, the method comprising:
   receiving light;
   storing at least one value corresponding to the light received;
   receiving a Ultraviolet Index (UVI) mode selection signal;
   determining an instantaneous UVI value corresponding to the at least one stored value;
   outputting a user input signal corresponding to an input by a user;
   selecting an output mode based on the user input signal;
   outputting an output signal, wherein the output signal output by the processor is based on the selected output mode; and
   displaying an indication based on at least one of the output signal and the determined instantaneous UVI value.

15. The method of controlling a wearable radiation detector of claim 14, wherein the selecting of the output mode based on the user input signal is performed via a touch screen.

* * * * *